United States Patent
Brachert

Patent Number: 5,931,880
Date of Patent: Aug. 3, 1999

[54] SYSTEM FOR DETERMINING SKEW STIFFNESS

[75] Inventor: Jost Brachert, Ditzingen, Germany

[73] Assignee: Robert Bosch GmbH, Germany

[21] Appl. No.: 08/739,547

[22] Filed: Oct. 30, 1996

[30] Foreign Application Priority Data

Nov. 30, 1995 [DE] Germany ............... 195 44 691

[51] Int. Cl.$^6$ ............... B60T 8/00; B62D 7/15
[52] U.S. Cl. ............... 701/38; 701/72; 701/90; 303/140
[58] Field of Search ............... 701/38, 41, 42, 701/72, 82, 83, 90, 91; 180/197, 422; 303/140, 146

[56] References Cited

U.S. PATENT DOCUMENTS

| | | | |
|---|---|---|---|
| 5,311,431 | 5/1994 | Cao et al. | 701/72 |
| 5,371,677 | 12/1994 | Ehret | 364/426.02 |
| 5,557,520 | 9/1996 | Suissa et al. | 701/29 |

FOREIGN PATENT DOCUMENTS

| | | | |
|---|---|---|---|
| 2266957 | 11/1993 | United Kingdom | G06F 15/20 |
| 2280651 | 2/1995 | United Kingdom | B62D 7/15 |

OTHER PUBLICATIONS

Automotive Handbook, Robert Bosch GmbH (1993), pp. 340–343.

*Primary Examiner*—Tan Q. Nguyen
*Attorney, Agent, or Firm*—Fulbright & Jaworski, LLP

[57] ABSTRACT

The yawing motion, the float angle, the longitudinal velocity of the vehicle, the front wheel steering angle, and optionally the rear wheel steering angle are determined. When certain driving conditions are present, at least the variable representing the front skew stiffness is determined as a function of the determined variables. In an alternative embodiment of the invention, the detection of the float angle is omitted. The variable representing the front skew stiffness is then calculated as a function of the detected yawing motion and the detected longitudinal velocity of the vehicle and as a function of a fixed, predefined value representing the rear skew stiffness. This calculation, too, occurs only when certain driving conditions are present.

14 Claims, 3 Drawing Sheets

SYSTEM FOR DETERMINING SKEW STIFFNESS

BACKGROUND OF THE INVENTION

Many variants of vehicle dynamics control systems in which the actual motion of the vehicle is compared with a desired motion are known. A desired vehicle motion is usually calculated by means of a vehicle model on the basis of variables which represent or affect the state of the vehicle. This calculated variable is compared with the corresponding measured variable. Depending on the deviation between the variables, actuators are then driven, which affect the vehicle dynamics. For example, it is known that a one-track model can be used to calculate a desired angular yaw rate (rotational velocity around the normal axis of the vehicle) as a function of the measured vehicle longitudinal velocity and the measured steering wheel angle and to compare this calculated rate with the angular yaw rate actually being measured. As a function of this comparison, it is then possible to influence the wheel brakes, the drive torque, the wheel suspensions, and/or the steering systems of the vehicle to achieve the desired vehicle dynamics. Instead of the desired yaw rate, however, it is also possible, as a substitute, to compare the desired difference between the rotational speeds of the front wheels with the corresponding actual value.

It is important in vehicle models of this type to have the most accurate possible knowledge of the influences which are exerted by the vehicle's tires. Such influences are usually expressed by the "skew stiffness". When the tires of the vehicle are replaced and thus when the actual skew stiffnesses differ from the values used in the one-track model mentioned above, then the vehicle motion which is calculated as the specified (desired) value differs from the motion actually desired. As a result, the wrong measures are taken to drive the actuators (brakes, engine, steering, and/or wheel suspension). An example of how the skew stiffness is used to calculate a desired vehicle motion is disclosed in U.S. Pat. No. 5,371,677, which is incorporated herein by reference.

SUMMARY OF THE INVENTION

The object of the present invention is to determine the skew stiffness or rather to adjust the vehicle dynamics control system to different types of tires.

According to the invention, a variable representing at least one skew stiffness of a motor vehicle is determined. For this purpose, the yawing motion, the float angle, the longitudinal velocity of the vehicle, the front wheel steering angle, and optionally the rear wheel steering angle are determined. The core of the invention consists in that, when certain driving conditions are present, at least the variable representing the front skew stiffness is determined as a function of the detected variables.

In an alternative embodiment of the invention, the float angle mentioned above is not determined. The variable representing the front skew stiffness is then calculated as a function of the detected yawing motion, the detected longitudinal velocity of the vehicle, the detected front and rear wheel steering angles, and as a function of a fixed value representing the rear skew stiffness. This calculation, too, is carried out only when certain driving conditions are present.

The system according to the invention thus supplies a good approximation of the skew stiffness actually present, as a result of which is possible for the model to be adaptively adjusted to a new set of tires on the vehicle.

In an advantageous embodiment of the invention, it is provided that the certain set of driving conditions which must be present are those which exist when the vehicle is traveling continuously around a curve. Steady-state travel around a curve can be determined as a function of a detected yaw acceleration, in that the absolute value of the yaw acceleration is compared with a first threshold value. If, according to a first embodiment of the invention, the float angle is available, the absolute value of the angular float velocity can also be compared with a second threshold value to determine the presence of steady-state travel around a curve. In either variant, it can be provided that the presence of steady-state travel around a curve is not determined until after the absolute value of the detected yaw acceleration and possibly the absolute value of the angular float velocity falls below the first or second threshold value for a predetermined length of time.

It can also be provided that the detected skew stiffness is filtered by a filter unit with a transmission behavior similar to that of a low-pass filter. If in this case a relatively low limit frequency is specified, the effects of erroneous measurements are reduced as a result. Because steady-state travel around a curve and thus a compensation of the skew stiffnesses according to the invention does not occur all that frequently in many driving situations, the skew stiffnesses which are determined can be stored in nonvolatile memory cells. These values are then used for the open-loop or closed-loop control of the driving dynamics of the vehicle as described above.

In addition to the direct measurement of the yawing motion, usually in terms of the angular yaw rate, it can also be provided that, to detect yaw, the measured longitudinal velocity of the vehicle is brought into relationship with the measured rotational speeds of the wheels of a nondriven axle.

In the first variant of the invention, in which the float angle is detected, the variable representing the front skew stiffness can be determined according to the equation:

$$c_v = \frac{l_h * m_g * \psi' * v}{l_g * (\delta_v - l_v * \psi' / v - \beta)}$$

The variable representing the rear skew stiffness can then be determined according to the equation:

$$c_h = \frac{\psi' * m_g * v - c_v * (\delta_v - l_v * \psi' / v - \beta)}{\delta_h + l_h * \psi' / v - \beta}$$

where $c_v$ is the value determined in the first step for the front skew stiffness.

In the second variant of the invention, in which the float angle is not detected, the determination of the variable representing the front skew stiffness is calculated according to the equation:

$$c_v = \frac{l_h * m_g * \psi' * v}{\frac{l_v * m_g * v * \psi'}{c_h} - l_g * (\delta_h - \delta_v) - l_g^2 * \frac{\psi'}{v}}$$

where $c_h$ is the value specified for the rear skew stiffness.

The symbols used in these equations have the following meanings:

$\phi'$=the detected yaw rate;
$\beta$=the detected float angle;
$v$=the detected longitudinal velocity of the vehicle;
$\delta_v$=the detected front wheel steering angle;

$\delta_h$=the rear wheel steering angle;
$l_v$=the distance of the center of gravity from the front;
$l_h$=the distance of the center of gravity from the rear;
$m_g$=the total weight of the vehicle; and
$l_g=l_v+l_h$.

DETAILED DESCRIPTION OF THE PREFERRED EMBODIMENT

Figure 1A:
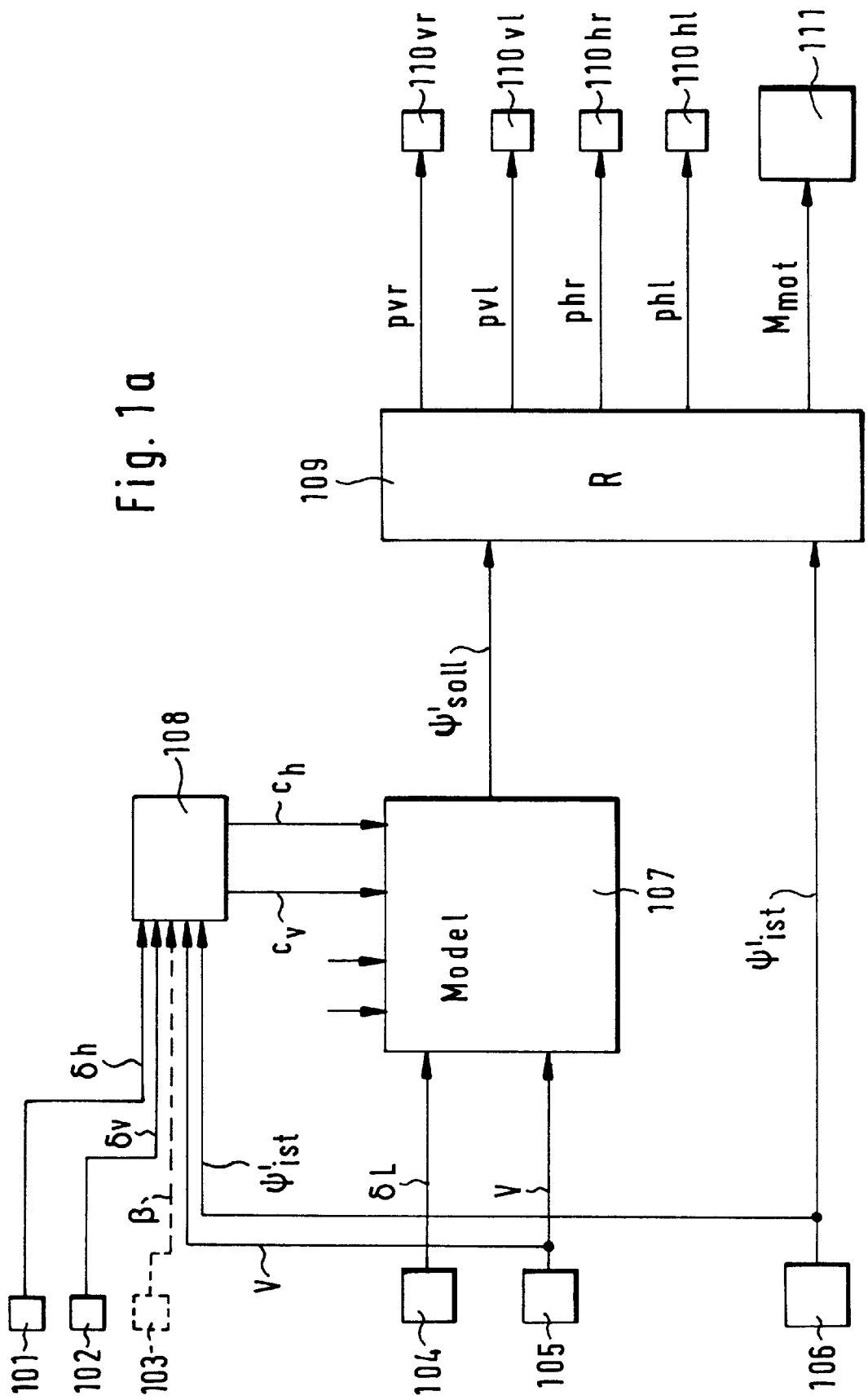
FIG. 1a is an overall circuit diagram of a first embodiment.

The one-track model already mentioned can be described by the following differential equations:

$$\beta' = \frac{c_v}{m_g * v} * \delta_v + \frac{c_h}{m_g * v} * \delta_h + \left(\frac{c_h * l_h - c_v * l_v}{m_g * v^2} - 1\right) * \psi' - \frac{c_v + c_h}{m_g * v} * \beta$$

$$\psi'' = \frac{c_v * l_v}{\theta_z} * \delta_v - \frac{c_h * l_h}{\theta_z} * \delta_h - \frac{c_v * l_v^2 + c_h * l_h^2}{\theta_z * v} * \psi' + \frac{c_h * l_h - c_v * l_v}{\theta_z} * \beta$$

where:
$\phi'$=the yaw rate;
$\phi''$=the yaw acceleration;
$\beta$=the float angle;
$\beta'$=the angular float velocity;
v=the longitudinal velocity of the vehicle;
$\delta_v$=the front wheel steering angle;
$\delta_h$=the rear wheel steering angle;
$l_v$=the distance of the center of gravity from the front;
$l_h$=the distance of the center of gravity from the rear;
$m_g$=the total weight of the vehicle;
$\delta$=the steering wheel angle;
$\theta_z$=the moment of inertia around the normal axis of the vehicle;
$c_v$=the skew stiffness at the front; and
$c_h$=the skew stiffness at the rear.

In addition to the geometric parameters listed above, the linear one-track model also contains in particular the skew stiffnesses $c_v$ and $c_h$, which depend on the type of tire in use at the time.

For the steady state, in which neither the float angle $\beta$ nor the yaw rate $\phi$ changes (angular float velocity $\beta'=0$ and yaw acceleration $\phi''=0$), it follows from the above equations describing the one-track model that:

$$c_v*(\delta_r-l_v*\psi'/v-\beta)+c_h*(\delta_h l_h*\psi'/v-\beta)=\psi'*v*m_g$$

$$c_v*(l_v*\delta_r-l_v^2*\psi'/v-l_v*\beta)+c_h*(-l_h*\delta_h l_h^2*\psi'/v+l_h*\beta)=0$$

From this we obtain:

$$c_v = \frac{l_h * m_g * \psi' * v}{l_g * (\delta_v - l_v * \psi' / v - \beta)} \quad (1)$$

and:

$$c_h = \frac{\psi' * m_g * v - c_v * (\delta_v - l_v * \psi' / v - \beta)}{\delta_h + l_h * \psi' / v - \beta} \quad (2)$$

This means that, in the steady-state case described above, it is possible, by measuring the yaw rate $\phi$, the float angle $\beta$, the longitudinal vehicle velocity v, and the front and rear wheel steering angles $\delta_v$ and $\delta_h$, to determine first the front skew stiffness $c_v$ and then the rear skew stiffness $c_h$.

The method given above for determining the skew stiffnesses on the basis of Equations (1) and (2) assumes that the float angle is detected. Proposals for measuring the float angle are to be found in, for example, the article published in ATZ Automobiltechnische Zeitschrift, Vol. 77, No. 7/8, 1975. Because the measurement of the float angle is very complicated, an alternative method for determining the skew stiffnesses is presented in the following.

Because the properties of the model are determined essentially by the ratio $c_v/c_h$ of the front and rear skew stiffnesses, the error introduced when only one of the two skew stiffnesses is compensated adaptively is relatively small. Because it was found experimentally that the changes in the front skew stiffness $c_v$ have a greater effect on the model properties than the rear skew stiffness $c_h$, only the front skew stiffness $c_v$ is compensated in this embodiment. As a result, however, it is possible to dispense with the measurement of the float angle $\beta$. For the steady-state case, in which neither the float angle $\beta$ nor the yaw rate $\phi'$ changes (angular float velocity $\beta'=0$, yaw acceleration $\phi''=0$), the following equation can be derived from the equations given above which describe the one-track model:

$$c_v = \frac{l_h * m_g * \psi' * v}{\frac{l_v * m_g * v * \psi'}{c_h} - l_g * (\delta_h - \delta_v) - l_g^2 * \frac{\psi'}{v}} \quad (3)$$

where $l_g=l_v+l_h$. Equation (3) shows that, in the steady state, it is possible to determine the front skew stiffness $c_v$ by measuring the yaw rate $\phi'$, the longitudinal vehicle velocity v, and the front and possibly the rear wheel steering angles $\delta_v$ and $\delta_h$. The rear skew stiffness $c_h$ remains at a preset compromise value.

The advantage of this variant of the invention is the elimination of the relatively complicated float angle measurement without having to accept more than a tolerable error in the determination of the skew stiffness.

It should also be pointed out in this context that, although the yaw rate $\phi'$ is to be found in Equations (1), (2), and (3), it does not necessarily have to be measured directly. Because of the relationship:

$$v=\phi'*R,$$

it is possible for the radius of curvature R of the steady-state travel around the curve to be used as the input variable for the compensation according to the invention instead of the angular yaw rate $\phi'$. This radius of curvature R can be calculated, for example, from the difference between the rotational speeds of the vehicle's wheels on the nondriven axle as follows:

$$R=v*(Sw/\Delta v),$$

where v is the longitudinal velocity of the vehicle, Sw is the wheel track, and $\Delta v$ is the difference between the rotational speeds of the vehicle's wheels on the nondriven axle.

If, instead of the angular yaw rate $\phi'$, the rotational speed difference $\Delta v$ of the wheels on the nondriven axle or the radius of curvature R of steady-state travel around a curve derived from that difference is determined, then Equations (1) and (2) change into the following Equations (4) and (5):

$$c_v = \frac{l_h * m_g * v^2 / R}{l_g * (\delta_v - l_v / R - \beta)} \quad (4)$$

$$c_h = \frac{m_g * v^2 / R - c_v * (\delta_v - l_v / R - \beta)}{\delta_h + l_h / R - \beta} \quad (5)$$

Of course, Equation (3) also changes in a corresponding manner.

Figure 1B:
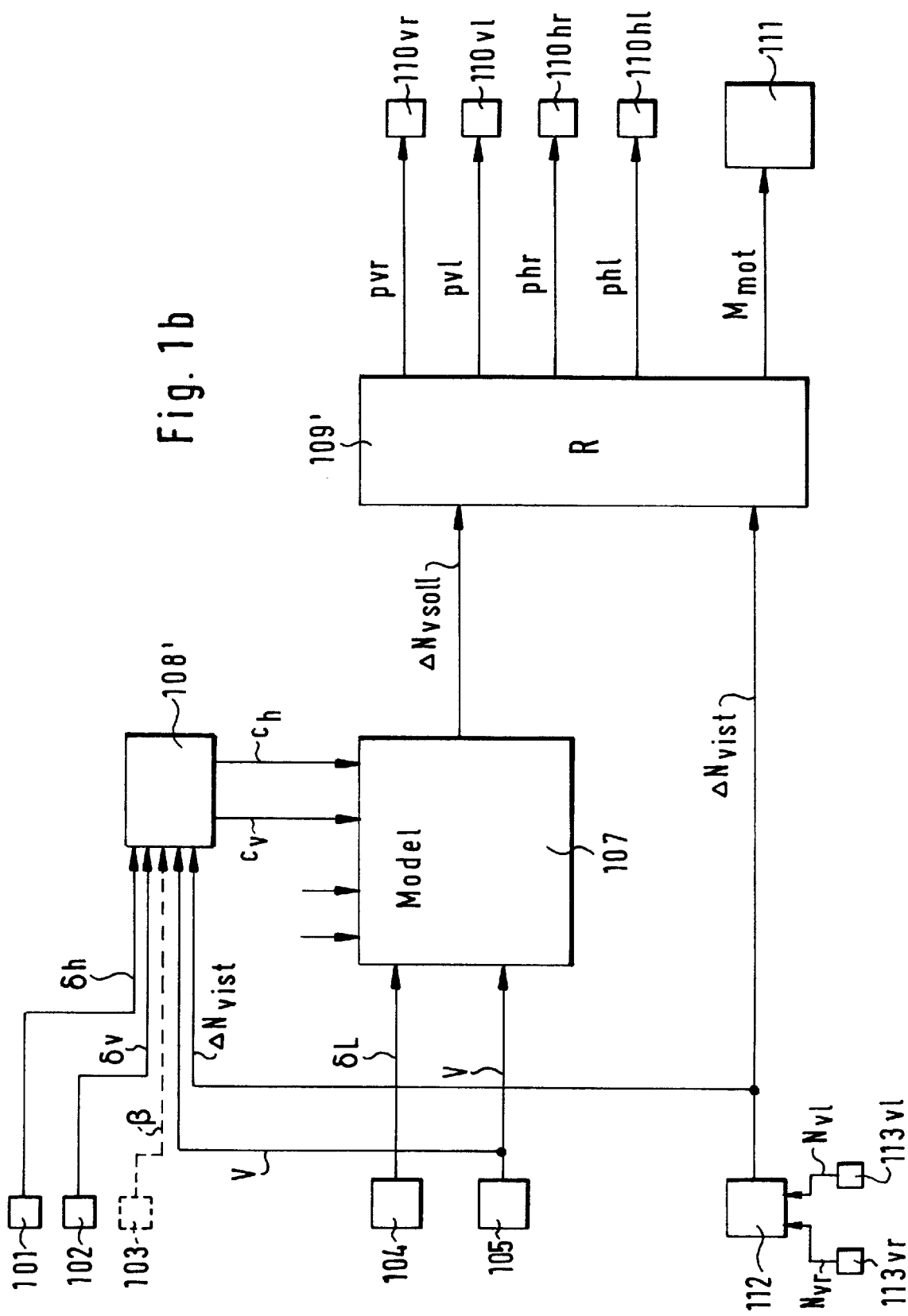
FIG. 1b is an overall circuit diagram of a second embodiment.

FIGS. 1a and 1b shows two design variants of the invention, integrated into a system for controlling the vehicle dynamics. For this purpose, blocks 101, 102 show sensors, which detect the front and rear wheel steering angles $\delta_v$ and $\delta_h$. The detection of the rear wheel steering angle $\delta_h$ can be omitted in cases where steering is achieved exclusively at the front axle. The detection of the float angle, if provided, is carried out in block 103. The longitudinal velocity v of the vehicle is detected in block 105.

In FIG. 1a, the yaw rate $\phi'_{ist}$ is determined as the actual controlled value in block 106, and the corresponding nominal value $\phi'_{soll}$ is calculated in block 107 by means of the one-track model as a function of the front and/or rear steering angle $\delta_v$, $\delta_h$ and the longitudinal vehicle velocity v.

In FIG. 1b, as an alternative, the difference $\Delta N_{vist}$ of the rotational speeds of the front wheels is determined in block 112 as the actual controlled value, and the corresponding nominal value $\Delta N_{vsoll}$ is calculated in block 107 by means of the one-track model as a function of the steering angles $\delta_v$, $\delta_h$ and the longitudinal vehicle velocity v. Reference numbers 113vr and 113vl designate the required sensors for measuring the rotational speeds of the wheels.

Controller 109, 109' then acts on wheel brakes 110vr, 110vl, 100hr, and 100hl, engine 111, and/or the steering or wheel suspension systems (not shown) in such a way as to bring the actual value in line with the nominal value. For this purpose, brake pressures pvr, pvl, phr, and phi are specified for the wheel brakes, for example, and an engine torque $M_{mot}$ is specified for the engine.

In addition to other variables which represent and/or influence the driving conditions, the skew stiffness $c_v$ and, depending on the embodiment, also the skew stiffness $c_h$, determined or compensated in accordance with the invention, also enter into model 107. These stiffnesses are calculated in blocks 108, 108', as will be explained in greater detail on the basis of FIG. 2.

Figure 2:
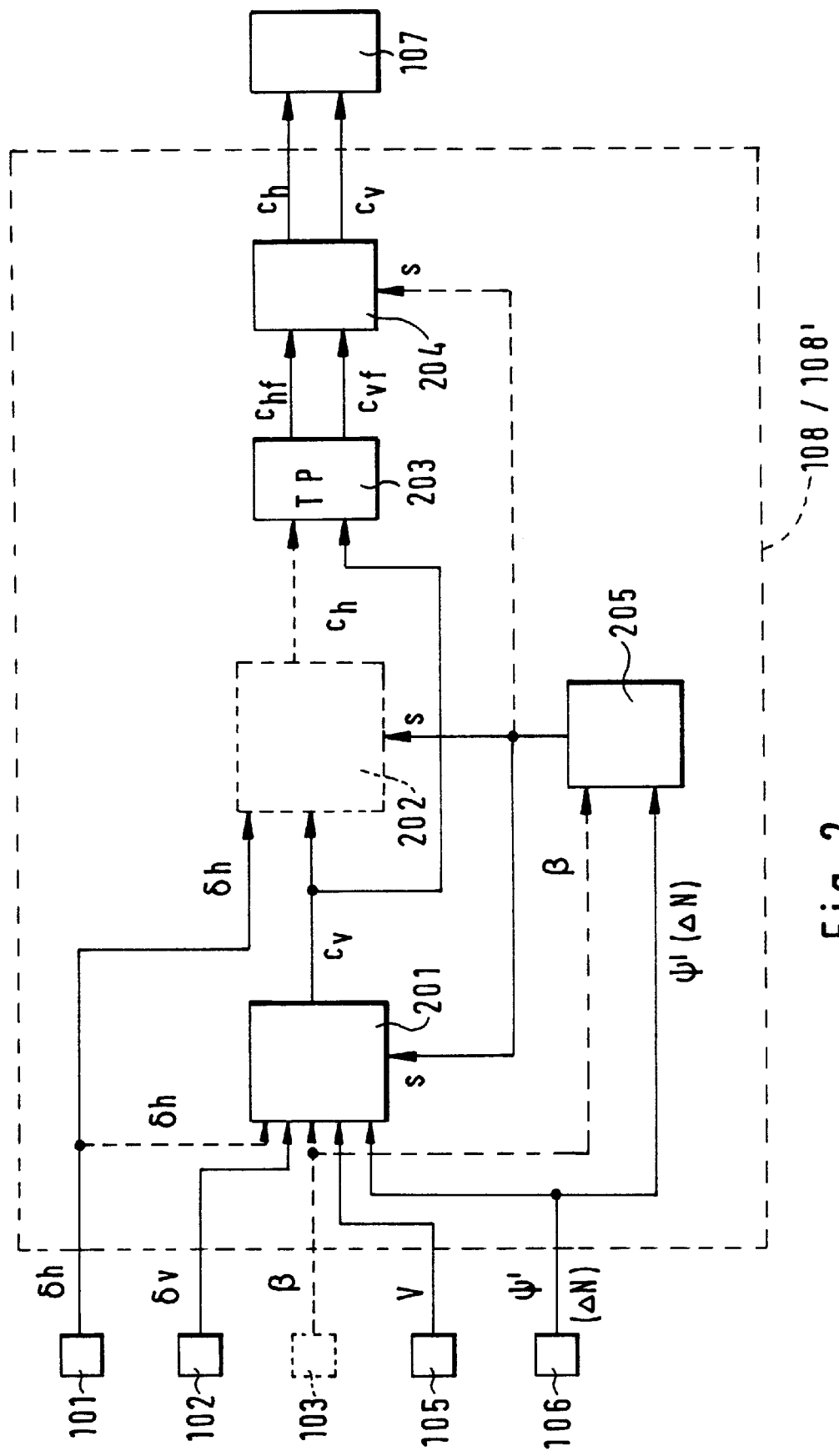
FIG. 2 is a detailed diagram of the stiffness calculation block.

In FIG. 2, the yaw rate $\phi'$ (or alternatively the difference between the rotational speeds $\Delta N$ of the front wheels), the longitudinal vehicle velocity v, and the front wheel steering angle $\delta_v$ are sent to block 201 as input variables. In the first variant of the invention, the float angle $\beta$ is also sent to block 201, whereas in the second variant, the rear steering angle $\delta_h$ is sent.

In block 201, the input variables are linked according to Equation (1) cited above in the case of the first variant (or, alternatively, in the presence of the wheel speeds $\Delta N$, according to Equation (4)); in the case of the second variant, they are linked according to Equation (3) cited above. On the output side of block 201, the value $c_v$ for the front skew stiffness is then available, and in the case of the first variant, it is sent to block 202, where the value $c_h$ for the rear skew stiffness is calculated according to Equation (2) (or, alternatively, in the presence of the wheel speeds $\Delta N$, according to Equation (5)) under consideration of the rear wheel steering angle $\delta_h$.

In the case of the first variant of the invention, the values $c_v$ and $c_h$ calculated in blocks 201, 202 are sent to a low-pass filter 203. In the second variant of the invention, in which only the value $c_v$ for the front skew stiffness is compensated, only this value is filtered in block 203. The filtered values $c_{vf}$ and $c_{hf}$ (first variant) or $c_{vf}$ (second variant) are saved in nonvolatile memory 204 and, as needed, sent to model 107 as new values $c_v$ and $c_h$ (first variant) or as new value $c_v$ (second variant) for the skew stiffness.

As already discussed above, it is important for the system according to the invention that the compensation of the skew stiffness is carried out only in certain driving situations (steady-state travel around a curve). The presence of a state such as this is determined in block 205.

For this purpose, the yaw rate $\phi'$ (or alternatively the difference of the wheel speeds $\Delta N$ of the front wheels) and the float angle $\beta$ are sent to block 205. The transmitted yaw rate $\phi'$ is differentiated in block 205 to obtain the yaw acceleration $\phi''$, and the float angle $\beta$ is differentiated to form the float rate $\beta'$. As already mentioned, the equations used in blocks 201, 202 apply only to the steady-state case, in which neither the float angle $\beta$ nor the yaw rate $\phi'$ changes (angular float rate $\beta'=0$, yaw acceleration $\phi''=0$). For this reason, the program checks in block 205 to see whether the two conditions:

$\beta'<S1$ and $\phi''<S2$ are satisfied simultaneously and for a predetermined length of time $t_{abgl}$. The two thresholds S1 and S2 are relatively small. If these conditions are satisfied for time $t_{abgl}$, the compensation signal S is generated in block 205.

In the case of the second variant of the invention, only the yaw rate $\phi'$ (or alternatively the difference of the wheel speeds $\Delta N$ of the front wheels) is sent to block 205, which is differentiated to form the yaw acceleration $\phi''$. Because Equation (3) used in the second variant (block 201 ) also applies only to the steady-state case, in which the yaw rate $\phi'$ does not change (yaw acceleration $\phi''=0$), the program checks in block 205 to see whether the condition:

$\phi''<S2$ is satisfied for a predetermined length of time $t_{abgl}$. Threshold S2 is made relatively small. If this condition is satisfied for time $t_{abgl}$, the compensation signal S is generated in block 205.

To ensure that the compensation of the skew stiffness according to the invention is initiated only in response to compensation signal S, FIG. 2 shows several possibilities, which can be used individually or combination.

A first possibility consists in that the release signal allows a calculation to be performed in blocks 201 and 202 only when the above-described compensation condition has been detected. Another possibility consists in allowing the calculated skew stiffness values to be saved (in block 204 ) only when the above-cited compensation condition is present.

I claim:

1. Method for controlling the actual motion of a vehicle, said method comprising determining input variables comprising yaw velocity $\phi$, float angle $\beta$, longitudinal vehicle velocity v, front wheel steering angle $\delta_v$, and optionally a rear wheel steering angle $\delta_h$, determining when the vehicle is undergoing steady state travel around a curve, determining a front skew stiffness $c_v$ and optionally a rear skew stiffness $c_h$ based on said input variables which are determined when said vehicle is undergoing steady state travel around a curve, calculating a desired vehicle motion based on said front skew stiffness $c_v$ and optionally said rear skew stiffness $c_h$, and controlling said vehicle so that the actual vehicle motion conforms to the desired vehicle motion.

2. Method as in claim 1 wherein said step of determining when said vehicle is undergoing steady state travel around a curve comprises determining a yaw acceleration $\phi''$ based on said yaw velocity $\phi'$, and comparing the absolute value $|\phi''|$ of said yaw acceleration with a threshold S1, and determining that steady state travel around a curve is present when $|\phi''|$ falls below S1 for a predetermined period of time $t_{abgl}$.

3. Method as in claim 2 wherein said step of determining when said vehicle is undergoing steady state travel around a curve comprises determining a float angle velocity $\beta'$ based on said float angle $\beta$, comparing the absolute value $\beta'|$ of said float angle velocity with a threshold S2, and determining that steady state travel around a curve is present when $|\phi''|$ falls below said threshold S1 and $|\beta'|$ falls below said threshold S2 for a predetermined period of time $t_{abgl}$.

4. Method as in claim 1 further comprising filtering said determined front skew stiffness $c_v$ and optionally said determined rear skew stiffness $c_h$ in a low pass filter prior to calculating said desired vehicle motion.

5. Method as in claim 1 wherein said front skew stiffness $c_v$ and optionally said rear skew stiffness $c_h$ is stored in a non-volatile memory cell and subsequently used for either open loop control or closed loop control of the actual vehicle motion.

6. Method as in claim 1 further comprising determining rational speeds of the non-driven vehicle wheels, determining said yaw velocity $\phi'$ based on said longitudinal vehicle velocity v and said rotational speeds of said non-driven wheels.

7. System according to claim 1, characterized in that the determination of the variable ($c_v$) representing the front skew stiffness is determined according to the equation:

$$c_v = \frac{l_h * m_g * \psi' * v}{l_g * (\delta_v - l_v * \psi'/v - \beta)}$$

where:

$\phi'$=the detected yaw rate;

$\beta$=the detected float angle;

v=the detected longitudinal velocity of the vehicle;

$\delta_v$=the detected front wheel steering angle;

$l_v$=the distance of the center of gravity from the front;

$l_h$=the distance of the center of gravity from the rear;

$m_g$=the total weight of the vehicle; and $l_g = l_v + l_h$.

8. Method for controlling the actual motion of a vehicle, said method comprising determining input variables comprising yaw velocity $\phi'$, longitudinal vehicle velocity v, front wheel steering angle $\delta_v$, and rear wheel steering angle $\delta_h$, determining when the vehicle is undergoing steady state travel around a curve, determining a front skew stiffness $c_v$ based on said input variable, which are determined when said vehicle is undergoing steady state travel around a curve, and a predetermined value $c_h$ for the rear skew stiffness, calculating a desired vehicle motion based on said front skew stiffness $c_v$, and controlling said vehicle so that the actual vehicle motion conforms to said desired vehicle motion.

9. Method as in claim 8 wherein said step of determining when said vehicle is undergoing steady state travel around a curve comprises determining a yaw acceleration $\phi''$ based on said yaw velocity $\phi'$, and comparing the absolute value $|\phi''|$ of said yaw acceleration with a threshold S1, and determining that steady state travel around a curve is present when $|\phi''|$ falls bellow S1 for a predetermined period of time $t_{abgl}$.

10. Method as in claim 8 further comprising filtering said determined front skew stiffness $c_v$ in a low pass filter prior to calculating said desired vehicle motion.

11. Method as in claim 8 wherein said front skew stiffness is stored in a non-volatile memory cell and subsequently used for either open loop control or closed loop control of the actual vehicle motion.

12. Method as in claim 8 further comprising determining rational speeds of the non-driven vehicle wheels, determining said yaw velocity $\phi'$ based on said longitudinal vehicle velocity v and said rotational speeds of said non-driven wheels.

13. System according to claim 8, characterized in that the determination of the variable ($c_v$) representing the front skew stiffness is determined according to the equation:

$$c_v = \frac{l_h * m_g * \psi' * v}{\dfrac{l_v * m_g * v * \psi'}{c_h} - l_g * (\delta_v - \delta_r) - l_g^2 * \dfrac{\psi'}{v}}$$

where:

$\phi'$=the detected yaw rate;

v=the detected longitudinal velocity of the vehicle;

$\delta_v$=the detected front wheel steering angle;

$\delta_h$=the detected rear wheel steering angle;

$l_v$=the distance of the center of gravity from the front;

$l_h$=the distance of the center of gravity from the rear;

$m_g$=the total weight of the vehicle;

$c_h$=the value predefined for the rear skew stiffness; and $l_g = l_v + l_h$.

14. System according to claim 13, characterized in that the determination of the variable ($c_h$) representing the rear skew stiffness is determined according to the equation:

$$c_h = \frac{\psi' * m_g * v - c_v * (\delta_v - l_v * \psi'/v)}{\delta_h + l_h * \psi'/v - \beta}$$

where:

$\phi'$=the detected yaw rate;

$\beta$=the detected float angle;

$v$ = the detected longitudinal velocity of the vehicle;

$\delta_v$ = the detected front wheel steering angle;

$\delta_h$ = the detected rear wheel steering angle;

$l_v$ = the distance of the center of gravity from the front;

$l_h$ = the distance of the center of gravity from the rear;

$m_g$ = the total weight of the vehicle;

$c_v$ = the determined value representing the front skew stiffness; and $l_g = l_v + l_h$.

* * * * *